(12) United States Patent  (10) Patent No.: US 11,710,394 B1
Delgado et al.  (45) Date of Patent: Jul. 25, 2023

(54) AUTOMATED OCCUPANT PROTECTION IN STATIONARY VEHICLES

(71) Applicant: GHOST AUTONOMY INC., Mountain View, CA (US)

(72) Inventors: Mario Delgado, San Francisco, CA (US); Volkmar Uhlig, Cupertino, CA (US); Par Botes, Atherton, CA (US)

(73) Assignee: GHOST AUTONOMY INC., Mountain View, CA (US)

(*) Notice: Subject to any disclaimer, the term of this patent is extended or adjusted under 35 U.S.C. 154(b) by 0 days.

(21) Appl. No.: 17/866,328

(22) Filed: Jul. 15, 2022

(51) Int. Cl.
| | | |
|---|---|---|
| *G06K 9/00* | (2022.01) | |
| *G08B 21/24* | (2006.01) | |
| *G06V 40/20* | (2022.01) | |
| *G06V 20/59* | (2022.01) | |

(52) U.S. Cl.
CPC .............. *G08B 21/24* (2013.01); *G06V 20/59* (2022.01); *G06V 40/20* (2022.01)

(58) Field of Classification Search
CPC ......... G08B 21/24; G06V 20/59; G06V 40/20
See application file for complete search history.

(56) References Cited

U.S. PATENT DOCUMENTS

| | | | | |
|---|---|---|---|---|
| 10,737,616 B1 | * | 8/2020 | Kreager | .................. B60N 2/28 |
| 11,230,246 B1 | * | 1/2022 | Beach | ................. G06K 9/6289 |
| 2014/0340219 A1 | * | 11/2014 | Russell | ................ G08B 29/188 |
| | | | | 340/539.12 |
| 2016/0200250 A1 | * | 7/2016 | Westmoreland | ......... B60Q 9/00 |
| | | | | 340/457.1 |
| 2016/0249191 A1 | * | 8/2016 | Avrahami | ............... H04W 4/12 |
| 2018/0354443 A1 | * | 12/2018 | Ebrahimi | ............. B60N 2/2812 |
| 2020/0312063 A1 | * | 10/2020 | Balakrishnan | ... G08B 13/19697 |
| 2021/0153752 A1 | * | 5/2021 | Park | ....................... A61B 5/746 |
| 2021/0402942 A1 | * | 12/2021 | Torabi | .................. G06N 3/0454 |
| 2022/0148334 A1 | * | 5/2022 | Tin | ....................... A61B 5/1128 |
| 2022/0341788 A1 | * | 10/2022 | Seoane | ................ G06V 20/597 |

* cited by examiner

*Primary Examiner* — Dhaval V Patel

(57) ABSTRACT

Automated occupant protection in stationary vehicles, including: detecting that an occupant is inside a stationary vehicle and that an operator is not in the stationary vehicle; detecting, based on one or more observations of the occupant, that one or more risk conditions have been met; and sending an alert to the operator in response to the one or more risk conditions being satisfied.

18 Claims, 8 Drawing Sheets

AUTOMATED OCCUPANT PROTECTION IN STATIONARY VEHICLES

BACKGROUND

Field of the Invention

The field of the invention is vehicle safety systems, or, more specifically, methods, apparatus, autonomous vehicles, and products for automated occupant protection in stationary vehicles.

Description Of Related Art

Unattended occupants in vehicles are at risk of harm due to high temperatures, reduced air flow, and other factors. For example, numerous pets and children die each year due to being forgotten inside of a vehicle during hot weather conditions.

SUMMARY

Automated occupant protection in stationary vehicles may include: detecting that an occupant is inside a stationary vehicle and that an operator is not in the stationary vehicle; detecting that one or more risk conditions have been met; and sending an alert to the operator in response to the one or more risk conditions being satisfied.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

The terminology used herein for the purpose of describing particular examples is not intended to be limiting for further examples. Whenever a singular form such as "a," "an," and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes," and/or "including," when used, specify the presence of the stated features, integers, steps, operations, processes, acts, elements, and/or components, but do not preclude the presence or addition of one or more other features, integers, steps, operations, processes, acts, elements, components, and/or any group thereof. Additionally, when an element is described as "plurality," it is understood to mean two or more of such an element. However, as set forth above, further examples may implement the same functionality using a single element.

It will be understood that when an element is referred to as being "connected" or "coupled" to another element, the elements may be directly connected or coupled or via one or more intervening elements. If two elements A and B are combined using an "or," this is to be understood to disclose all possible combinations, i.e. only A, only B, as well as A and B. An alternative wording for the same combinations is "at least one of A and B." The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Figure 1:
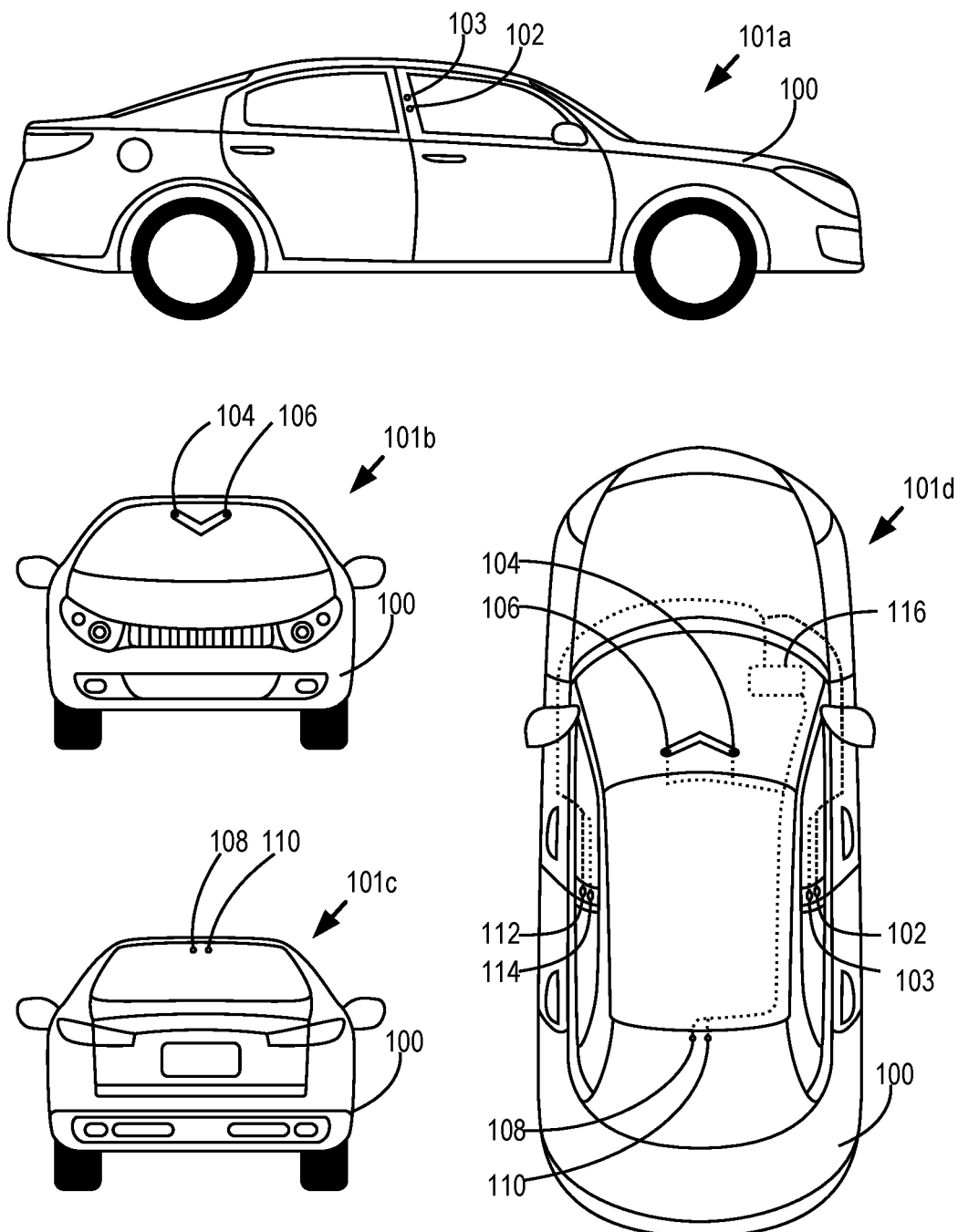
FIG. 1 shows example views of an autonomous vehicle for automated occupant protection in stationary vehicles according to some embodiments of the present disclosure according to some embodiments of the present disclosure.

Automated occupant protection in stationary vehicles may be implemented in an autonomous vehicle. Accordingly, FIG. 1 shows multiple views of an autonomous vehicle 100 configured for automated occupant protection in stationary vehicles according to embodiments of the present disclosure. Right side view 101a shows a right side of the autonomous vehicle 100. Shown in the right-side view 101a are cameras 102 and 103, configured to capture image data, video data, and/or audio data of the environmental state of the autonomous vehicle 100 from the perspective of the right side of the car. Front view 101b shows a front side of the autonomous vehicle 100. Shown in the front view 101b are cameras 104 and 106, configured to capture image data, video data, and/or audio data of the environmental state of the autonomous vehicle 100 from the perspective of the front of the car. Rear view 101c shows a rear side of the autonomous vehicle 100. Shown in the rear view 101c are cameras 108 and 110, configured to capture image data, video data, and/or audio data of the environmental state of the autonomous vehicle 100 from the perspective of the rear of the car. Top view 101d shows a rear side of the autonomous vehicle 100. Shown in the top view 101d are cameras 102-110. Also shown are cameras 112 and 114, configured to capture image data, video data, and/or audio data of the environmental state of the autonomous vehicle 100 from the perspective of the left side of the car.

Further shown in the top view 101d is an automation computing system 116. The automation computing system 116 comprises one or more computing devices configured to control one or more autonomous operations (e.g., autonomous driving operations) of the autonomous vehicle 100. For example, the automation computing system 116 may be configured to process sensor data (e.g., data from the cameras 102-114 and potentially other sensors), operational data (e.g., a speed, acceleration, gear, orientation, turning direction), and other data to determine an operational state and/or operational history of the autonomous vehicle. The automation computing system 116 may then determine one or more operational commands for the autonomous vehicle (e.g., a change in speed or acceleration, a change in brake application, a change in gear, a change in turning or orientation). The automation computing system 116 may also capture and store sensor data. Operational data of the autonomous vehicle may also be stored in association with corresponding sensor data, thereby indicating the operational data of the autonomous vehicle 100 at the time the sensor data was captured.

Although the autonomous vehicle 100 if FIG. 1 is shown as car, it is understood that autonomous vehicles 100 configured for automated occupant protection in stationary vehicles may also include other vehicles, including motorcycles, planes, helicopters, unmanned aerial vehicles (UAVs, e.g., drones), or other vehicles. Moreover, it is understood that additional cameras or other external sensors may also be included in the autonomous vehicle 100.

Automated occupant protection in stationary vehicles in accordance with the present disclosure is generally implemented with computers, that is, with automated computing machinery. For further explanation, therefore, FIG. 2 sets forth a block diagram of automated computing machinery comprising an exemplary automation computing system 116 configured for automated occupant protection in stationary vehicles according to specific embodiments. The automation computing system 116 of FIG. 2 includes at least one computer Central Processing Unit (CPU) package 204 as well as random access memory 206 ('RAM') which is connected through a high-speed memory bus 208 and bus adapter 210 to CPU packages 204 via a front side bus 211 and to other components of the automation computing system 116.

A CPU package 204 may comprise a plurality of processing units. For example, each CPU package 204 may comprise a logical or physical grouping of a plurality of processing units. Each processing unit may be allocated a particular process for execution. Moreover, each CPU package 204 may comprise one or more redundant processing units. A redundant processing unit is a processing unit not allocated a particular process for execution unless a failure occurs in another processing unit. For example, when a given processing unit allocated a particular process fails, a redundant processing unit may be selected and allocated the given process. A process may be allocated to a plurality of processing units within the same CPU package 204 or different CPU packages 204. For example, a given process may be allocated to a primary processing unit in a CPU package 204. The results or output of the given process may be output from the primary processing unit to a receiving process or service. The given process may also be executed in parallel on a secondary processing unit. The secondary processing unit may be included within the same CPU package 204 or a different CPU package 204. The secondary processing unit may not provide its output or results of the process until the primary processing unit fails. The receiving process or service will then receive data from the secondary processing unit. A redundant processing unit may then be selected and have allocated the given process to ensure that two or more processing units are allocated the given process for redundancy and increased reliability.

The CPU packages 204 are communicatively coupled to one or more sensors 212. The sensors 212 are configured to capture sensor data describing the operational and environmental conditions of an autonomous vehicle. For example, the sensors 212 may include cameras (e.g., the cameras 102-114 of FIG. 1), accelerometers, Global Positioning System (GPS) radios, Lidar sensors, or other sensors. As described herein, cameras may include a solid state sensor 212 with a solid-state shutter capable of measuring photons or a time of flight of photons. For example, a camera may be configured to capture or measure photons captured via the shutter for encoding as images and/or video data. As another example, a camera may emit photons and measure the time of flight of the emitted photons. Cameras may also include event cameras configured to measure changes in light and/or motion of light.

Although the sensors 212 are shown as being external to the automation computing system 116, it is understood that one or more of the sensors 212 may reside as a component of the automation computing system 116 (e.g., on the same board, within the same housing or chassis). The sensors 212 may be communicatively coupled with the CPU packages 204 via a switched fabric 213. The switched fabric 213 comprises a communications topology through which the CPU packages 204 and sensors 212 are coupled via a plurality of switching mechanisms (e.g., latches, switches, crossbar switches, field programmable gate arrays (FPGAs)). For example, the switched fabric 213 may implement a mesh connection connecting the CPU packages 204 and sensors 212 as endpoints, with the switching mechanisms serving as intermediary nodes of the mesh connection. The CPU packages 204 and sensors 212 may be in communication via a plurality of switched fabrics 213. For example, each of the switched fabrics 213 may include the CPU packages 204 and sensors 212, or a subset of the CPU packages 204 and sensors 212, as endpoints. Each switched fabric 213 may also comprise a respective plurality of switching components. The switching components of a given switched fabric 213 may be independent (e.g., not connected) of the switching components of other switched fabrics 213 such that only switched fabric 213 endpoints (e.g., the CPU packages 204 and sensors 212) are overlapping across the switched fabrics 213. This provides redundancy such that, should a connection between a CPU package 204 and sensor 212 fail in one switched fabric 213, the CPU package 204 and sensor 212 may remain connected via another switched fabric 213. Moreover, in the event of a failure in a CPU package 204, a processor of a CPU package 204, or a sensor, a communications path excluding the failed component and including a functional redundant component may be established.

The CPU packages 204 and sensors 212 are configured to receive power from one or more power supplies 215. The power supplies 215 may comprise an extension of a power system of the autonomous vehicle 100 or an independent power source (e.g., a battery, a capacitor). The power supplies 215 may supply power to the CPU packages 204 and sensors 212 by another switched fabric 214. The switched fabric 214 provides redundant power pathways such that, in the event of a failure in a power connection, a new power connection pathway may be established to the CPU packages 204 and sensors 212.

Stored in RAM 206 is an automation module 220. The automation module 220 may be configured to process sensor data from the sensors 212 to determine a driving decision for the autonomous vehicle. The driving decision comprises one or more operational commands for an autonomous vehicle 100 to affect the movement, direction, or other function of the autonomous vehicle 100, thereby facilitating autonomous driving or operation of the vehicle. Such operational commands may include a change in the speed of the autonomous vehicle 100, a change in steering direction, a change in gear, or other commands. For example, the automation module 220 may provide sensor data and/or processed sensor data as one or more inputs to a trained machine learning model (e.g., a trained neural network) to determine the one or more operational commands. The operational commands may then be communicated to autonomous vehicle control systems 223 via a vehicle interface 222.

In some embodiments, the automation module 220 may be configured to determine an exit path for an autonomous vehicle 100 in motion. The exit path includes one or more operational commands that, if executed, are determined and/or predicted to bring the autonomous vehicle 100 safely to a stop (e.g., without collision with an object, without violating one or more safety rules). The automation module 220 may determine both a driving decision and an exit path at a predefined interval. The automation module 220 may then send the driving decision and the exit path to the autonomous vehicle control systems 223. The autonomous vehicle control systems 223 may be configured to execute the driving decision unless an error state has been reached. If an error decision has been reached, therefore indicating a possible error in functionality of the automation computing system 116, the autonomous vehicle control systems 223 may then execute a last received exit path in order to bring the autonomous vehicle 100 safely to a stop. Thus, the autonomous vehicle control systems 223 are configured to receive both a driving decision and exit path at predefined intervals, and execute the exit path in response to an error.

The autonomous vehicle control systems 223 are configured to affect the movement and operation of the autonomous vehicle 100. For example, the autonomous vehicle control systems 223 may activate (e.g., apply one or more control signals) to actuators or other components to turn or otherwise change the direction of the autonomous vehicle 100, accelerate or decelerate the autonomous vehicle 100, change a gear of the autonomous vehicle 100, or otherwise affect the movement and operation of the autonomous vehicle 100.

Further stored in RAM 206 is a data collection module 224 configured to process and/or store sensor data received from the one or more sensors 212. For example, the data collection module 224 may store the sensor data as captured by the one or more sensors 212, or processed sensor 212 data (e.g., sensor 212 data having object recognition, compression, depth filtering, or any combination of these). Such processing may be performed by the data collection module 224 in real-time or in substantially real-time as the sensor data is captured by the one or more sensors 212. The processed sensor data may then be used by other functions or modules. For example, the automation module 220 may use processed sensor data as input to determine one or more operational commands. The data collection module 224 may store the sensor data in data storage 218.

Also stored in RAM 206 is a data processing module 226. The data processing module 226 is configured to perform one or more processes on stored sensor data (e.g., stored in data storage 218 by the data collection module 218) prior to upload to an execution environment 227. Such operations can include filtering, compression, encoding, decoding, or other operations. The data processing module 226 may then communicate the processed and stored sensor data to the execution environment 227.

Further stored in RAM 206 is a hypervisor 228. The hypervisor 228 is configured to manage the configuration and execution of one or more virtual machines 229. For example, each virtual machine 229 may emulate and/or simulate the operation of a computer. Accordingly, each virtual machine 229 may comprise a guest operating system 216 for the simulated computer. Each instance of virtual machine 229 may host the same operating system or one or more different operating systems. The hypervisor 228 may manage the creation of a virtual machine 229 including installation of the guest operating system 216. The hypervisor 228 may also manage when execution of a virtual machine 229 begins, is suspended, is resumed, or is terminated. The hypervisor 228 may also control access to computational resources (e.g., processing resources, memory resources, device resources) by each of the virtual machines.

Each of the virtual machines 229 may be configured to execute one or more of the automation modules 220, the data collection module 224, the data processing module 226, or combinations thereof. Moreover, as is set forth above, each of the virtual machines 229 may comprise its own guest operating system 216. Guest operating systems 216 useful in autonomous vehicles in accordance with some embodiments of the present disclosure include UNIX™, Linux™, Microsoft Windows™, AIX™, IBM's i OS™, and others. For example, the autonomous vehicle 100 may be configured to execute a first operating system when the autonomous vehicle is in an autonomous (or partially autonomous) driving mode and the autonomous vehicle 100 may be configured to execute a second operating system when the autonomous vehicle is not in an autonomous (or partially autonomous) driving mode. In such an example, the first operating system may be formally verified, secure, and operate in real-time such that data collected from the sensors 212 are processed within a predetermined period of time, and autonomous driving operations are performed within a predetermined period of time, such that data is processed and acted upon essentially in real-time. Continuing with this example, the second operating system may not be formally verified, may be less secure, and may not operate in real-time as the tasks that are carried out (which are described in greater detail below) by the second operating system are not as time-sensitive the tasks (e.g., carrying out self-driving operations) performed by the first operating system.

Although the example included in the preceding paragraph relates to an embodiment where the autonomous vehicle 100 may be configured to execute a first operating system when the autonomous vehicle is in an autonomous (or partially autonomous) driving mode and the autonomous vehicle 100 may be configured to execute a second operating system when the autonomous vehicle is not in an autonomous (or partially autonomous) driving mode, other embodiments are within the scope of the present disclosure. For example, in another embodiment one CPU (or other appropriate entity such as a chip, CPU core, and so on) may be executing the first operating system and a second CPU (or other appropriate entity) may be executing the second operating system, where switching between these two modalities is accomplished through fabric switching, as described in greater detail below. Likewise, in some embodiments, processing resources such as a CPU may be partitioned where a first partition supports the execution of the first operating system and a second partition supports the execution of the second operating system.

The guest operating systems 216 may correspond to a particular operating system modality. An operating system modality is a set of parameters or constraints which a given operating system satisfies, and are not satisfied by operating systems of another modality. For example, a given operating system may be considered a "real-time operating system" in that one or more processes executed by the operating system must be performed according to one or more time constraints. The time constraint may not necessarily be in real-time, but instead with the highest or one of the highest priorities so that operations indicated for a real-time modality are executed faster than operations without such a priority. For example, as the automation module 220 must make determinations as to operational commands to facilitate autonomous operation of a vehicle. Accordingly, the automation module 220 must make such determinations within one or more time constraints in order for autonomous operation to be performed in real-time. The automation module 220 may then be executed in an operating system (e.g., a guest operating system 216 of a virtual machine 229) corresponding to a "real-time operating system" modality. Conversely, the data processing module 226 may be able to perform its processing of sensor data independent of any time constraints, and may then be executed in an operating system (e.g., a guest operating system 216 of a virtual machine 229) corresponding to a "non-real-time operating system" modality.

As another example, an operating system (e.g., a guest operating system 216 of a virtual machine 229) may comprise a formally verified operating system. A formally verified operating system is an operating system for which the correctness of each function and operation has been verified with respect to a formal specification according to formal proofs. A formally verified operating system and an unverified operating system (e.g., one that has not been formally verified according to these proofs) can be said to operate in different modalities.

Figure 2:
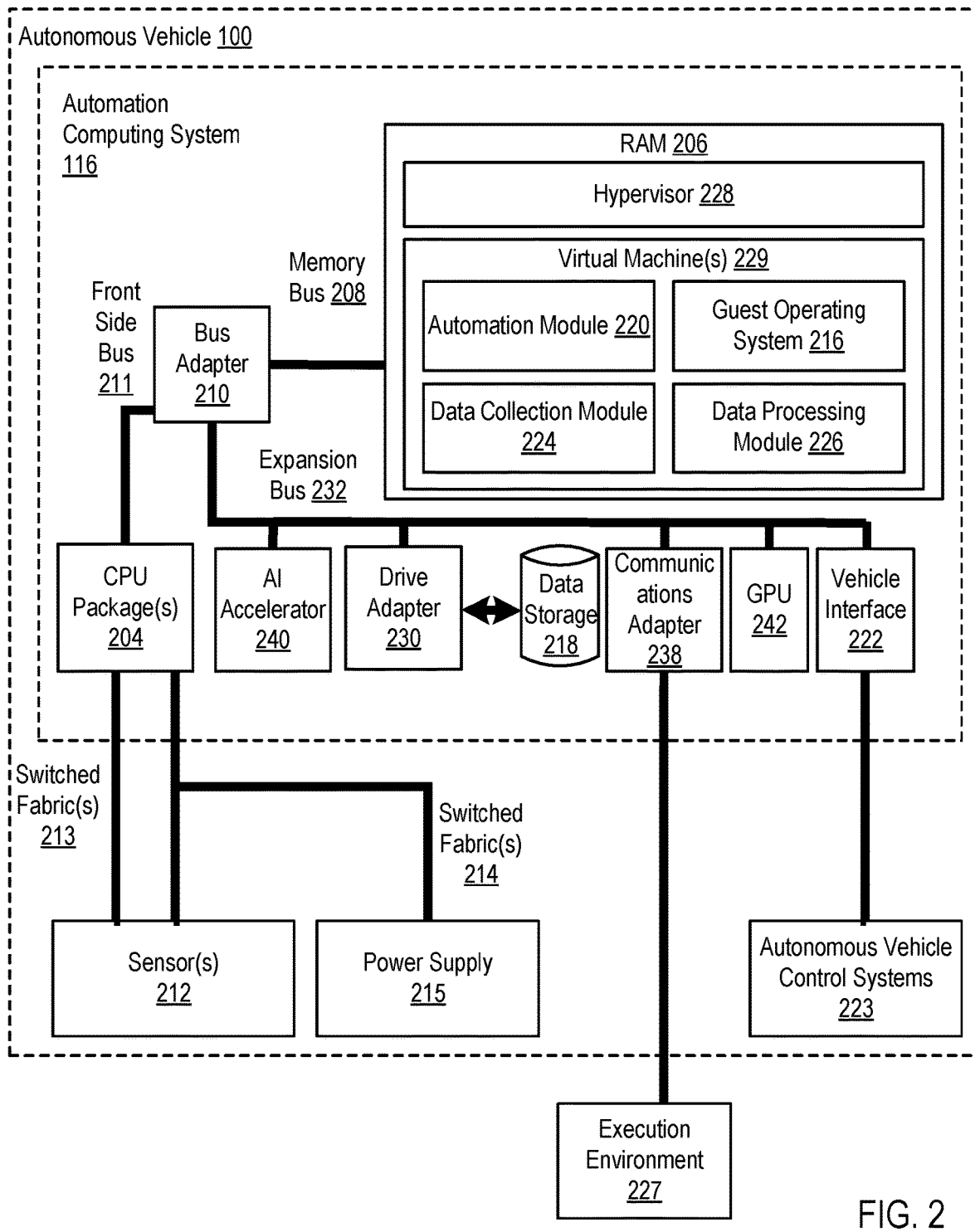
FIG. 2 is a block diagram of an autonomous computing system for automated occupant protection in stationary vehicles according to some embodiments of the present disclosure.

The automation module 220, data collection module 224, data collection module 224, data processing module 226, hypervisor 228, and virtual machine 229 in the example of FIG. 2 are shown in RAM 206, but many components of such software typically are stored in non-volatile memory also, such as, for example, on data storage 218, such as a disk drive. Moreover, any of the automation module 220, data collection module 224, and data processing module 226 may be executed in a virtual machine 229 and facilitated by a guest operating system 216 of that virtual machine 229.

The automation computing system 116 of FIG. 2 includes disk drive adapter 230 coupled through expansion bus 232 and bus adapter 210 to CPU package(s) 204 and other components of the automation computing system 116. Disk drive adapter 230 connects non-volatile data storage to the automation computing system 116 in the form of data storage 218. Disk drive adapters 230 useful in computers configured for automated occupant protection in stationary vehicles according to various embodiments include Integrated Drive Electronics ('IDE') adapters, Small Computer System Interface ('SCSI') adapters, and others. Non-volatile computer memory also may be implemented for as an optical disk drive, electrically erasable programmable read-only memory (so-called 'EEPROM' or 'Flash' memory), RAM drives, and so on.

The exemplary automation computing system 116 of FIG. 2 includes a communications adapter 238 for data communications with other computers and for data communications with a data communications network. Such data communications may be carried out serially through RS-238 connections, through external buses such as a Universal Serial Bus ('USB'), through data communications networks such as IP data communications networks, and in other ways. Communications adapters implement the hardware level of data communications through which one computer sends data communications to another computer, directly or through a data communications network. Examples of communications adapters useful in computers configured for automated occupant protection in stationary vehicles according to specific embodiments include modems for wired dial-up communications, Ethernet (IEEE 802.3) adapters for wired data communications, 802.11 adapters for wireless data communications, as well as mobile adapters (e.g., cellular communications adapters) for mobile data communications. For example, the automation computing system 116 may communicate with one or more remotely disposed execution environments 227 via the communications adapter 238.

The exemplary automation computing system of FIG. 2 also includes one or more Artificial Intelligence (AI) accelerators 240. The AI accelerator 240 provides hardware-based assistance and acceleration of AI-related functions, including machine learning, computer vision, etc. Accordingly, performance of any of the automation module 220, data collection module 224, data processing module 226, or other operations of the automation computing system 116 may be performed at least in part by the AI accelerators 240.

The exemplary automation computing system of FIG. 2 also includes one or more graphics processing units (GPUs) 242. The GPUs 242 are configured to provide additional processing and memory resources for processing image and/or video data, including encoding, decoding, etc. Accordingly, performance of any of the automation module 220, data collection module 224, data processing module 226, or other operations of the automation computing system 116 may be performed at least in part by the GPUs 242.

Figure 3:
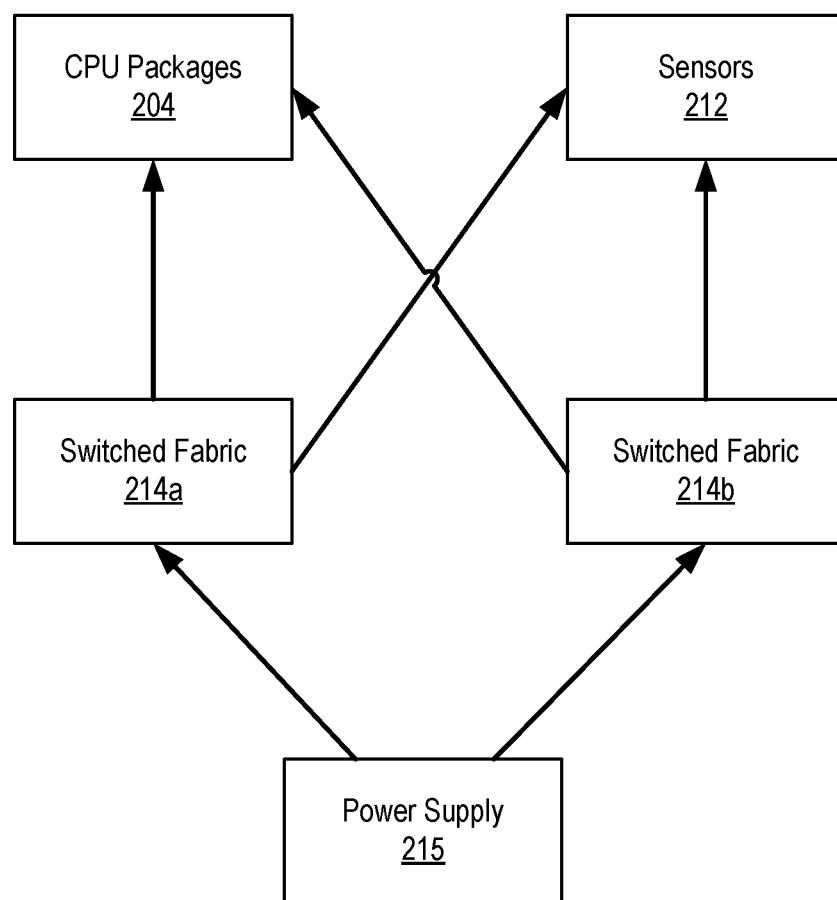
FIG. 3 is a block diagram of a redundant power fabric for automated occupant protection in stationary vehicles according to some embodiments of the present disclosure.

FIG. 3 shows an example redundant power fabric for automated occupant protection in stationary vehicles. The redundant power fabric provides redundant pathways for power transfer between the power supplies 215, the sensors 212, and the CPU packages 204. In this example, the power supplies 215 are coupled to the sensors 212 and CPU packages via two switched fabrics 214a and 214b. The topology shown in FIG. 3 provides redundant pathways between the power supplies 215, the sensors 212, and the CPU packages 204 such that power can be rerouted through any of multiple pathways in the event of a failure in an active connection pathway. The switched fabrics 214a and 214b may provide power to the sensors 212 using various connections, including Mobile Industry Processor Interface (MIPI), Inter-Integrated Circuit (I2C), Universal Serial Bus (USB), or another connection. The switched fabrics 214a and 214b may also provide power to the CPU packages 204 using various connections, including Peripheral Component Interconnect Express (PCIe), USB, or other connections. Although only two switched fabrics 214a and 214b are shown connecting the power supplies 215 to the sensors 212 and CPU packages 204, the approach shown by FIG. 3 can be modified to include three, four, five, or more switched fabrics 214.

Figure 4:
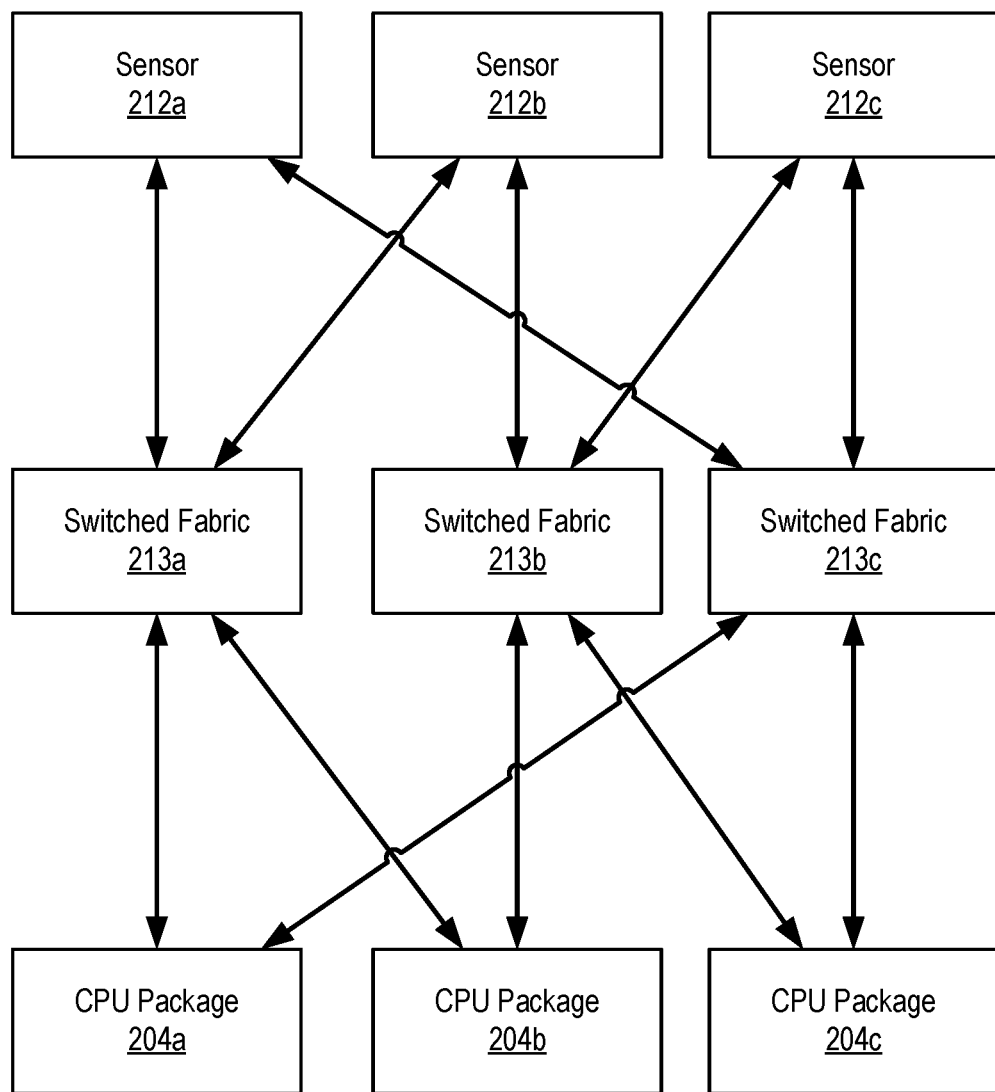
FIG. 4 is a block diagram of a redundant data fabric for automated occupant protection in stationary vehicles according to some embodiments of the present disclosure.

FIG. 4 is an example redundant data fabric for automated occupant protection in stationary vehicles. The redundant data fabric provides redundant data connection pathways between sensors 212 and CPU packages 204. In this example view, three CPU packages 204a, 204b, and 204c are connected to three sensors 212a, 212b, and 212c via three switched fabrics 213a, 213b, and 213c. Each CPU package 204a, 204b, and 204c is connected to a subset of the switched fabrics 213a, 213b, and 213c. For example, CPU package 204a is connected to switched fabrics 213a and 213c, CPU package 204b is connected to switched fabrics 213a and 213b, and CPU package 204c is connected to switched fabrics 213b and 213c. Each switched fabric 213a, 213b, and 213c is connected to a subset of the sensors 212a, 212b, and 212c. For example, switched fabric 213a is connected to sensors 212a and 212b, switched fabric 213b is connected to sensor 212b and 212c, and switched fabric 213c is connected to sensors 212a and 212c. Under this topology, each CPU package 204a, 204b, and 204c has an available connection path to any sensor 212a, 212b, and 212c. It is understood that the topology of FIG. 4 is exemplary, and that CPU packages, switched fabrics, sensors, or connections between components may be added or removed while maintaining redundancy.

Figure 5:
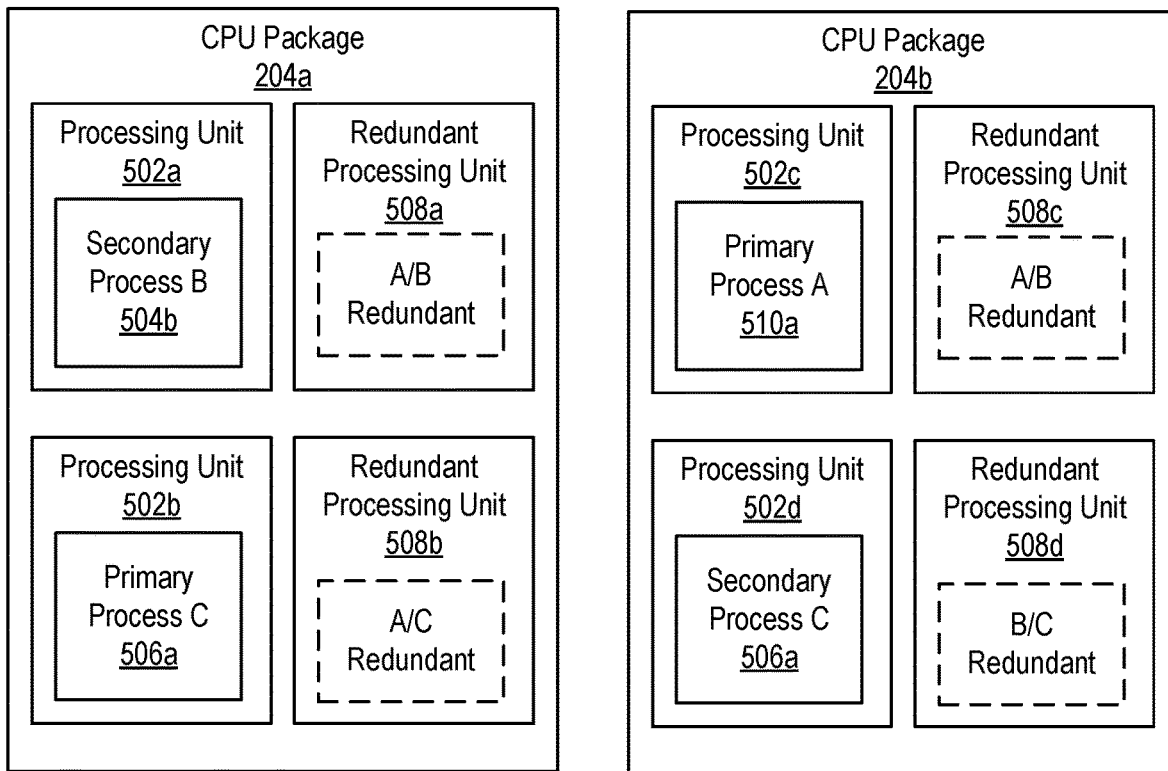
FIG. 5 is an example view of process allocation across CPU packages for automated occupant protection in stationary vehicles according to some embodiments of the present disclosure.
Figure 5:
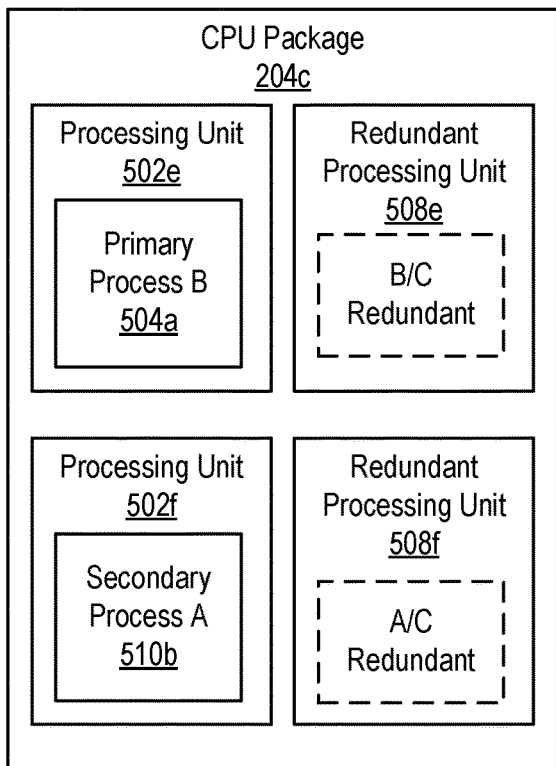

FIG. 5 is an example view of process allocation across CPU packages for automated occupant protection in stationary vehicles. Shown are three CPU packages 204a, 204b, and 204c. Each CPU package 204a includes a processing unit that has been allocated (e.g., by a hypervisor 228 or other process or service) primary execution of a process and another processing unit that has been allocated secondary execution of a process. As set forth herein, primary execution of a process describes an executing instance of a process whose output will be provided to another process or service. Secondary execution of the process describes executing an instance of the process in parallel to the primary execution, but the output may not be output to the other process or service. For example, in CPU package 204a, processing unit 502a has been allocated secondary execution of "process B," denoted as secondary process B 504b, while processing unit 502b has been allocated primary execution of "process C," denoted as primary process C 506a.

CPU package 204a also comprises two redundant processing units that are not actively executing a process A, B, or C, but are instead reserved in case of failure of an active processing unit. Redundant processing unit 508a has been reserved as "A/B redundant," indicating that reserved processing unit 508a may be allocated primary or secondary execution of processes A or B in the event of a failure of a processing unit allocated the primary or secondary execution of these processes. Redundant processing unit 508b has been reserved as "A/C redundant," indicating that reserved processing unit 508b may be allocated primary or secondary execution of processes A or C in the event of a failure of a processing unit allocated the primary or secondary execution of these processes.

CPU package 204b includes processing unit 502c, which has been allocated primary execution of "process A," denoted as primary process A 510a, and processing unit 502d, which has been allocated secondary execution of "process C," denoted as secondary process C 506a. CPU package 204b also includes redundant processing unit 508c, reserved as "A/B redundant," and redundant processing unit 508d, reserved as "B/C redundant." CPU package 204c includes processing unit 502e, which has been allocated primary execution of "process B," denoted as primary process B 504a, and processing unit 502f, which has been allocated secondary execution of "process A," denoted as secondary process A 510b. CPU package 204c also includes redundant processing unit 508e, reserved as "B/C redundant," and redundant processing unit 508f, reserved as "A/C redundant."

As set forth in the example view of FIG. 5, primary and secondary instances processes A, B, and C are each executed in an allocated processing unit. Thus, if a processing unit performing primary execution of a given process fails, the processing unit performing secondary execution may instead provide output of the given process to a receiving process or service. Moreover, the primary and secondary execution of a given process are executed on different CPU packages. Thus, if an entire processing unit fails, execution of each of the processes can continue using one or more processing units handling secondary execution. The redundant processing units 508a-f allow for allocation of primary or secondary execution of a process in the event of processing unit failure. This further prevents errors caused by processing unit failure as parallel primary and secondary execution of a process may be restored. The number of CPU packages, processing units, redundant processing units, and processes may be modified according to performance requirements while maintaining redundancy.

Figure 6:
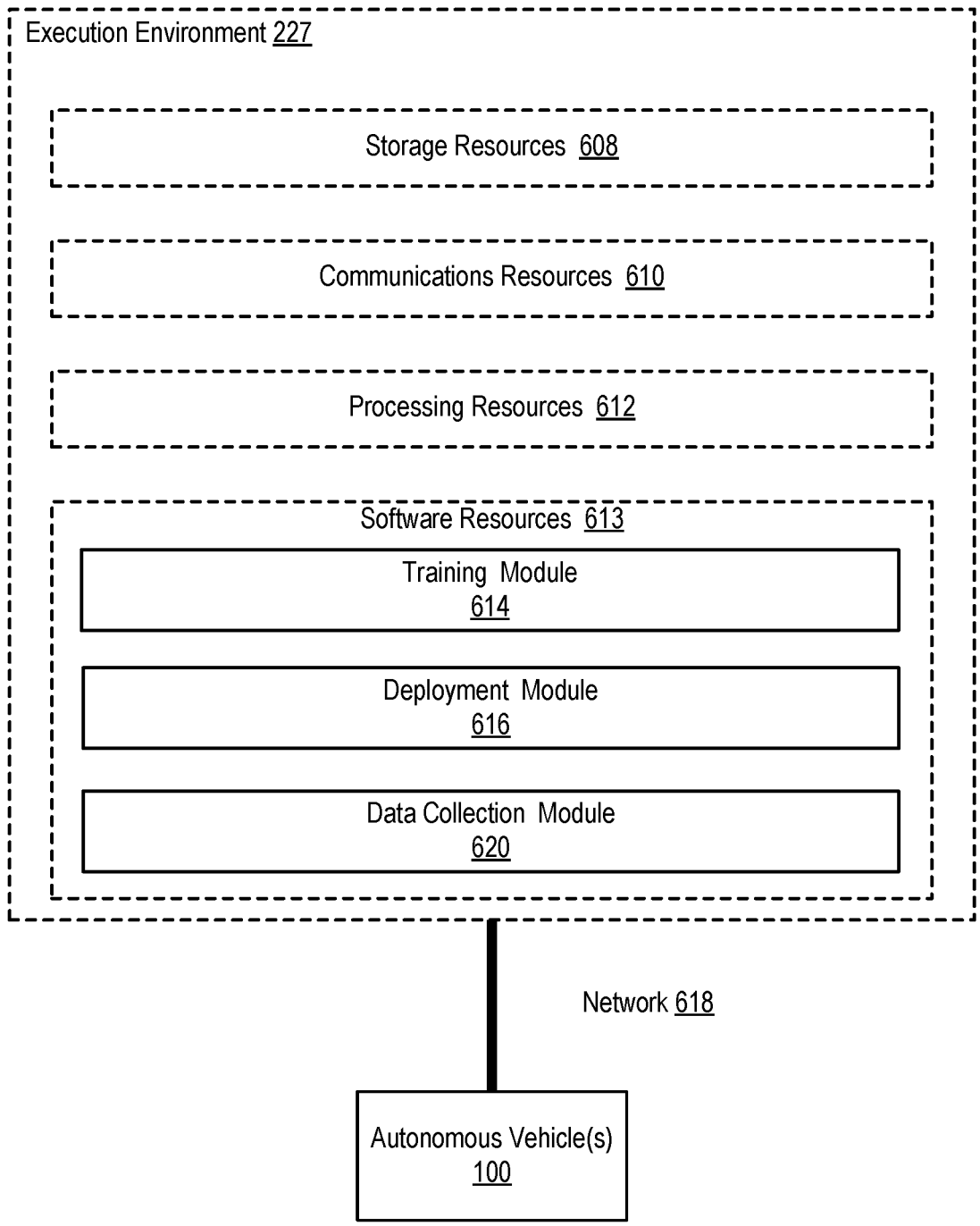
FIG. 6 is an example view of an execution environment for automated occupant protection in stationary vehicles according to some embodiments of the present disclosure.

For further explanation, FIG. 6 sets forth a diagram of an execution environment 227 in accordance with some embodiments of the present disclosure. The execution environment 227 depicted in FIG. 6 may be embodied in a variety of different ways. The execution environment 227 may be provided, for example, by one or more physical or virtual machine components consisting of bare-metal applications, operating systems such as Android, Linux, Real-time Operating systems (RTOS), Automotive RTOS, such as AutoSAR, and others, including combinations thereof. The execution environment 227 may also be provided by cloud computing providers such as Amazon AWS™, Microsoft Azure™, Google Cloud™, and others, including combinations thereof. Alternatively, the execution environment 227 may be embodied as a collection of devices (e.g., servers, storage devices, networking devices) and software resources that are included in a computer or distributed computer or private data center. The execution environment 227 may be constructed in a variety of other ways and may even include resources within one or more autonomous vehicles or resources that communicate with one or more autonomous vehicles.

The execution environment 227 depicted in FIG. 6 may include storage resources 608, which may be embodied in many forms. For example, the storage resources 608 may include flash memory, hard disk drives, nano-RAM, 3D crosspoint non-volatile memory, MRAM, non-volatile phase-change memory (PCM), storage class memory (SCM), or many others, including combinations of the storage technologies described above. Other forms of computer memories and storage devices may be utilized as part of the execution environment 227, including DRAM, SRAM, EEPROM, universal memory, and many others. The storage resources 608 may also be embodied, in embodiments where the execution environment 227 includes resources offered by a cloud provider, as cloud storage resources such as Amazon Elastic Block Storage (EBS) block storage, Amazon S3 object storage, Amazon Elastic File System (EFS) file storage, Azure Blob Storage, and many others. The example execution environment 227 depicted in FIG. 6 may implement a variety of storage architectures, such as block storage where data is stored in blocks, and each block essentially acts as an individual hard drive, object storage where data is managed as objects, or file storage in which data is stored in a hierarchical structure. Such data may be saved in files and folders, and presented to both the system storing it and the system retrieving it in the same format.

The execution environment 227 depicted in FIG. 6 also includes communications resources 610 that may be useful in facilitating data communications between components within the execution environment 227, as well as data communications between the execution environment 227 and computing devices that are outside of the execution environment 227. Such communications resources may be embodied, for example, as one or more routers, network switches, communications adapters, and many others, including combinations of such devices. The communications resources 610 may be configured to utilize a variety of different protocols and data communication fabrics to facilitate data communications. For example, the communications resources 610 may utilize Internet Protocol ('IP') based technologies, fibre channel (FC) technologies, FC over ethernet (FCoE) technologies, InfiniBand (TB) technologies, NVM Express (NVMe) technologies and NVMe over fabrics (NVMeoF) technologies, and many others. The communications resources 610 may also be embodied, in embodiments where the execution environment 227 includes resources offered by a cloud provider, as networking tools and resources that enable secure connections to the cloud as well as tools and resources (e.g., network interfaces, routing tables, gateways) to configure networking resources in a virtual private cloud. Such communications resources may be useful in facilitating data communications between components within the execution environment 227, as well as data communications between the execution environment 227 and computing devices that are outside of the execution environment 227 (e.g., computing devices that are included within an autonomous vehicle).

The execution environment 227 depicted in FIG. 6 also includes processing resources 612 that may be useful in useful in executing computer program instructions and performing other computational tasks within the execution environment 227. The processing resources 612 may include one or more application-specific integrated circuits (ASICs) that are customized for some particular purpose, one or more central processing units (CPUs), one or more digital signal processors (DSPs), one or more field-programmable gate arrays (FPGAs), one or more systems on a chip (SoCs), or other form of processing resources 612. The processing resources 612 may also be embodied, in embodiments where the execution environment 227 includes resources offered by a cloud provider, as cloud computing resources such as one or more Amazon Elastic Compute Cloud (EC2) instances, event-driven compute resources such as AWS Lambdas, Azure Virtual Machines, or many others.

The execution environment 227 depicted in FIG. 6 also includes software resources 613 that, when executed by processing resources 612 within the execution environment 227, may perform various tasks. The software resources 613 may include, for example, one or more modules of computer program instructions that when executed by processing resources 612 within the execution environment 227 are useful in training neural networks configured to determine control autonomous vehicle control operations. For example, a training module 614 may train a neural network using training data including sensor 212 data and control operations recorded or captured contemporaneous to the training data. In other words, the neural network may be trained to encode a relationship between an environment relative to an autonomous vehicle 100 as indicated in sensor 212 data and the corresponding control operations effected by a user or operation of the autonomous vehicle. The training module 614 may provide a corpus of training data, or a selected subset of training data, to train the neural network. For example, the training module 614 may select particular subsets of training data associated with particular driving conditions, environment states, etc. to train the neural network.

The software resources 613 may include, for example, one or more modules of computer program instructions that when executed by processing resources 612 within the execution environment 227 are useful in deploying software resources or other data to autonomous vehicles 100 via a network 618. For example, a deployment module 616 may provide software updates, neural network updates, or other data to autonomous vehicles 100 to facilitate autonomous vehicle control operations.

The software resources 613 may include, for example, one or more modules of computer program instructions that when executed by processing resources 612 within the execution environment 227 are useful in collecting data from autonomous vehicles 100 via a network 618. For example, a data collection module 620 may receive, from autonomous vehicles 100, collected sensor 212, associated control operations, software performance logs, or other data. Such data may facilitate training of neural networks via the training module 614 or stored using storage resources 608.

Figure 7:
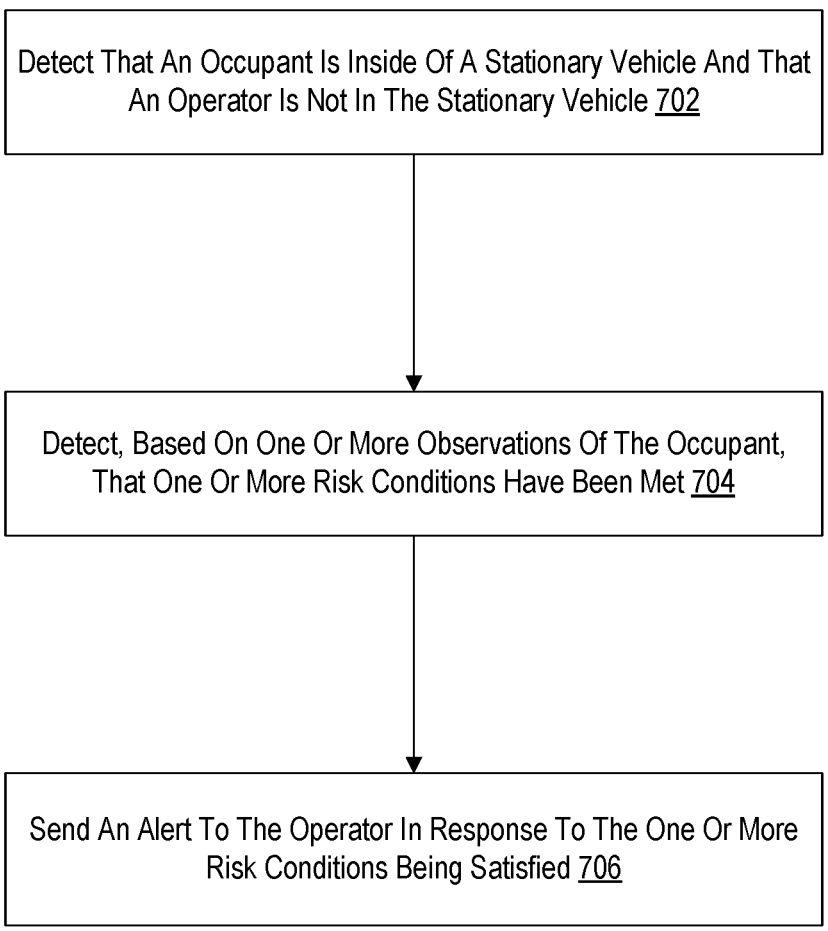
FIG. 7 is a flowchart of an example method for automated occupant protection in stationary vehicles according to some embodiments of the present disclosure.

For further explanation, FIG. 7 sets forth a flow chart illustrating an exemplary method for automated occupant protection in stationary vehicles according to some embodiments of the present disclosure. The method of FIG. 7 may be performed in an autonomous vehicle 100. For example, in some embodiments, the method of FIG. 7 may be performed by an automation computing system 116 or other computing system of an autonomous vehicle 100. In some embodiments, the method of FIG. 7 may be performed in a non-autonomous vehicle lacking autonomous driving functionality. For example, the method of FIG. 7 may be performed by a vehicle control system (VCS) or other computing system in a non-autonomous vehicle having the requisite sensors as described in further detail below.

The method of FIG. 7 includes detecting 702 that an occupant is inside of a stationary vehicle and that an operator is not inside the stationary vehicle. The stationary vehicle may include, for example, a parked or otherwise stopped car. Accordingly, the operator may include a driver of the stationary vehicle that has exited the stationary vehicle. As referred to herein, an occupant may include any living being within the cabin or interior of the stationary vehicle. Accordingly, the occupant may include a human passenger, including adult passengers, children, infants, and the like, an animal such as a cat, dog, or other animal, or other living beings. In some embodiments, detecting 702 that an occupant is inside of the stationary vehicle may include detecting that an occupant of a particular classification or not of a particular classification is inside of the stationary vehicle. For example, detecting 702 that an occupant is inside of the stationary vehicle may include detecting that a non-adult human occupant is inside the vehicle, detecting that a non-human occupant is inside the vehicle, detecting that a restrained occupant (e.g., an infant in a car seat) is inside the vehicle, detecting other classifications of occupants, or combinations thereof.

Detecting 702 that an occupant is inside of the stationary vehicle and that the operator is not in the stationary vehicle includes both a determination that an operator is not in the stationary vehicle and a determination that the occupant is inside of the stationary vehicle. In some embodiments, each determination is made independent of the other determination. For example, a computing system of the vehicle may periodically perform independent determinations as to whether the operator is not in the stationary vehicle and as to whether the occupant is inside of the stationary vehicle. In some embodiments, one determination may be performed in response to the other determination. For example, in some embodiments, a determination that the occupant is inside of the stationary vehicle may be performed, and potentially repeatedly performed, in response to a determination that the operator is not in the stationary vehicle or has exited the stationary vehicle. In other embodiments, one or more of determining that the occupant is inside of the stationary vehicle and determining that the operator is not in the stationary vehicle may be performed in response to detecting 704 that one or more risk conditions have been met, as will be described in further detail below.

In some embodiments, determining that an operator is not in the stationary vehicle may include detecting a change in weight of the stationary vehicle or of contents of the interior of the stationary vehicle. For example, where the stationary vehicle includes a weight or pressure sensor in a driver's seat or other operator seat, detecting a reduction in weight or pressure as measured by the weight or pressure sensor in the driver's seat or other operator seat. In some embodiments, determining that an operator is not in the stationary vehicle may include determining a door or other portal of the vehicle opening. In some embodiments, detecting that an operator is not in the stationary vehicle may include receiving video data from one or more camera sensors capturing or identifying an operator outside of the stationary vehicle. In some embodiments, determining that an operator is not in the stationary vehicle may include receiving video data from one or more camera sensors capturing an interior of the stationary vehicle and determining that the operator is not in the stationary vehicle (e.g., failing to identify the operator in the video data).

In some embodiments, determining that the operator is not in the stationary vehicle may include determining a location of the operator or a distance from the operator to the stationary vehicle. For example, in some embodiments, the location or distance of the operator may be determined to be a location or distance of a mobile device associated with the operator, such as a mobile device paired to the vehicle. Accordingly, in some embodiments, an exact location (e.g., from a GPS sensor in the mobile device) may be used to determine a location of the operator. That location may then be compared to a location of the vehicle to determine that the operator is not in the stationary vehicle. As another example, one or more signals may be sent to the mobile device and a distance to the mobile device may be determined using one or more attributes of a response from the mobile device, such as a signal strength. In some embodiments, determining that the operator is not in the stationary vehicle may include detecting a combination or sequence of particular events. For example, determining that the operator is not in the stationary vehicle may include detecting that a driver's side door has opened in combination with a detected reduction in weight or pressure on the driver's seat. For example, a variety of approaches, including additional or different approaches, may be used to determine that an operator is not in the stationary vehicle.

In some embodiments, detecting that the occupant is inside of the stationary vehicle includes receiving video data from camera sensors capturing an interior of the stationary vehicle and determining that an occupant is inside of the stationary vehicle. For example, one or more occupants in one or more occupant seats (e.g., passenger seats) or any portion of the interior may be identified from the video data. In some embodiments, detecting that the occupant is inside of the stationary vehicle may be based on one or more weight measurements for contents of the vehicle. For example, in some embodiments, weight or pressure sensors may be used to measure weight or pressure for passenger seats or other seats of the vehicle. Where the measured weight or pressure exceeds a threshold, it may be determined that an occupant is inside of the stationary vehicle. As another example, in some embodiments, a weight measurement from before the vehicle became stationary (e.g., taken when a door or portal opens prior to the vehicle being started, and therefore prior to any occupants or operators entering the vehicle) may be compared to a weight measurement taken after the vehicle has become stationary. Where a difference between the measurements exceeds a threshold, it may be determined that an occupant is still in the stationary vehicle. In some embodiments, determining that the occupant is inside of the stationary vehicle may include detecting that a passenger door or other portal was not opened after the vehicle became stationary (e.g., after a defined time threshold or relative to another event).

In some embodiments, determining that the occupant is inside of the stationary vehicle may be based on video data received from camera sensors capturing an exterior of the stationary vehicle. For example, camera data captured before a trip or prior to the vehicle starting may be used to identify one or more occupants entering the vehicle. Camera data captured after the vehicle has become stationary may be used to identify any occupants exiting the vehicle. An occupant identified as entering the vehicle but not leaving the vehicle may be used to determine that the occupant is inside of the stationary vehicle. In some embodiments, a combination or sequence of criteria may be used to determine that an occupant is inside of the stationary vehicle. For example, any of the approaches described above for determining whether the occupant is inside of the stationary vehicle may be used in combination via a rules-based approach, an equation or other weighing of factors, as input to a trained model, or otherwise used to determine whether an occupant is inside of the stationary vehicle.

The method of FIG. 7 also includes detecting 704, based on one or more observations of the occupant, that one or more risk conditions have been satisfied. The one or more risk conditions are one or more conditions indicative of potentially harm for an occupant of the stationary vehicle due to heat, weather conditions, or other safety criteria. The particular risk conditions being detected may vary according to particular design considerations, according to user or manufacturer configurations, regulatory requirements, and the like.

The one or more observations of the user may include one or more physiological or behavioral observations of the occupant. For example, with respect to physiological observations, the one or observations of the occupant may include a heart rate, temperature, or carbon dioxide output of the occupant. As an example, in some embodiments, an interior of the vehicle may include a temperature sensor such as an infrared thermometer that may be directed at the occupant in order to measure a skin temperature of the occupant. As another example, in some embodiments, a heart rate of an occupant may be detected by applying a red filter to or extracting a red channel from video data from one or more interior-facing cameras. As a further example, the carbon dioxide output of the occupant may be measured using a carbon dioxide sensor measuring carbon dioxide levels of the interior of the vehicle.

The one or more behavioral observations of the occupant include observations identified using one or more behavioral machine learning models. The one or more behavioral machine learning models may accept, as input, video data capturing the occupant as well as potentially other inputs. The one or more behavioral machine learning models provide, as output, one or more identified or observed characteristics of the occupant. As an example, the one or more behavioral observations may include a breathing rate of the occupant. The breathing rate may be determined by identifying expansions or contractions of a chest or diaphragm of the occupant to estimate the breathing rate. The one or more behavioral observations may include particular facial expressions, body postures, gestures, and the like identified as indicating physical discomfort or potential risk to the occupant.

Accordingly, the one or more risk conditions may include a threshold for the one or more observations, or a threshold for a rate of change for the one or more observations. For example, the one or more risk conditions may include a threshold physical temperature of the occupant. As another example, the one or more risk conditions may include a threshold rate of change for a breathing rate or carbon dioxide levels. As another example, the one or more risk conditions may include a threshold change in pupil dilation. Other thresholds may also be used to define risk conditions. The one or more risk conditions may also include particular behavioral observations, such as particular identified facial expressions, gestures, body postures, and the like, as well as combinations thereof.

In some embodiments, the one or more risk conditions may include risk conditions independent of observations of the occupant. For example, in some embodiments, the one or more risk conditions may include one or more time thresholds. Accordingly, in some embodiments, detecting 704 that one or more risk conditions have been satisfied includes determining whether the one or more time thresholds have been passed. The one or more time thresholds may include a time duration relative to a particular event, such as the car becoming stationary (e.g., parked or turned off), a door such as a driver's side door being opened and closed, a determination that the operator is not in the stationary vehicle as described above, or relative to another event.

In some embodiments, the one or more risk conditions include one or more temperature thresholds. The one or more temperature thresholds may include an interior temperature threshold (e.g., a temperature of an interior of the vehicle), an exterior temperature threshold (e.g., a temperature of the environment outside of the vehicle), or both. Accordingly, in some embodiments, the detecting 704 that one or more risk conditions have been satisfied includes determining whether the one or more temperature thresholds have been met. In some embodiments, the one or more risk conditions include a state of doors, windows, latches, or other portals of the vehicle. As an example, the one or more risk conditions may include all windows being raised, all doors being shut, or combinations thereof.

In some embodiments, the one or more risk conditions include a distance threshold relative to an operator (e.g., the driver). For example, in some embodiments, a distance of the operator to the autonomous vehicle may be calculated by sending one or more signals to a mobile device associated with the operator. The mobile device may then return an exact location of the mobile device, or one or more attributes from which a distance to the mobile device may be determined, such as a signal strength. Accordingly, in some embodiments, determining 704 that one or more risk conditions have been met includes determining whether a distance from the vehicle to a mobile device associated with the operator exceeds a threshold.

In some embodiments, the one or more risk conditions being detected (e.g., the one or more risk conditions being checked to see if they are detected) may be based on various criteria. For example, in some embodiments, the one or more risk conditions may be based on user configurations, manufacturer configurations, regulatory requirements, and the like. As another example, in some embodiments, the one or more risk conditions may be based on a classification of occupant in the vehicle. For example, a type of occupant (e.g., animal, infant, young adult, incapacitated adult) may be determined from video data, such as video data from internal or external cameras. A particular set of risk conditions may then be checked for the determined type of occupant.

The method of FIG. 7 also includes sending 706 an alert to the operator in response to the one or more risk conditions being satisfied. Sending 706 the alert to the operator may include sending 706 an alert to one or more devices associated with the operator, or to one or more accounts associated with the operator (e.g., email accounts, messaging accounts, application executing on a mobile device associated with the operator). Accordingly, in some embodiments, the alert may be embodied or encoded as a push notification, a text notification, an email notification, an automated phone call, or otherwise embodied. In some embodiments, the alert may include a link, button, or user interface element that allows for one or more remedial actions to be performed by the vehicle in response to a selection by the operator. For example, such remedial actions may include activating or modifying a temperature of an air conditioning system of the vehicle, lowering or partially lowering one or more windows, unlocking one or more doors, and other actions. In some embodiments, an alert may be sent to recipients other than the operator, and that such alerts may be sent in addition to or instead of an alert to the operator. Such recipients may include emergency services such as police, medial, or firefighter responders, other designated users (e.g., users or contacts designated by the operator or another entity as receiving such alerts), or other recipients. In some embodiments, remedial actions other than sending an alert may be performed in addition to or instead of sending the alert. Examples of such remedial actions are described in further details below.

The approaches described herein allow for automatic detection of whether an occupant is in a stationary vehicle that is susceptible to some risk due to temperature or other environmental conditions. By alerting the operator, the operator has a chance to prevent harm to any occupants by returning to the vehicle or through remote intervention, such as in scenarios where an occupant is forgotten in the vehicle or the operator forgets to lower windows to allow for greater airflow and temperature reduction.

Figure 8:
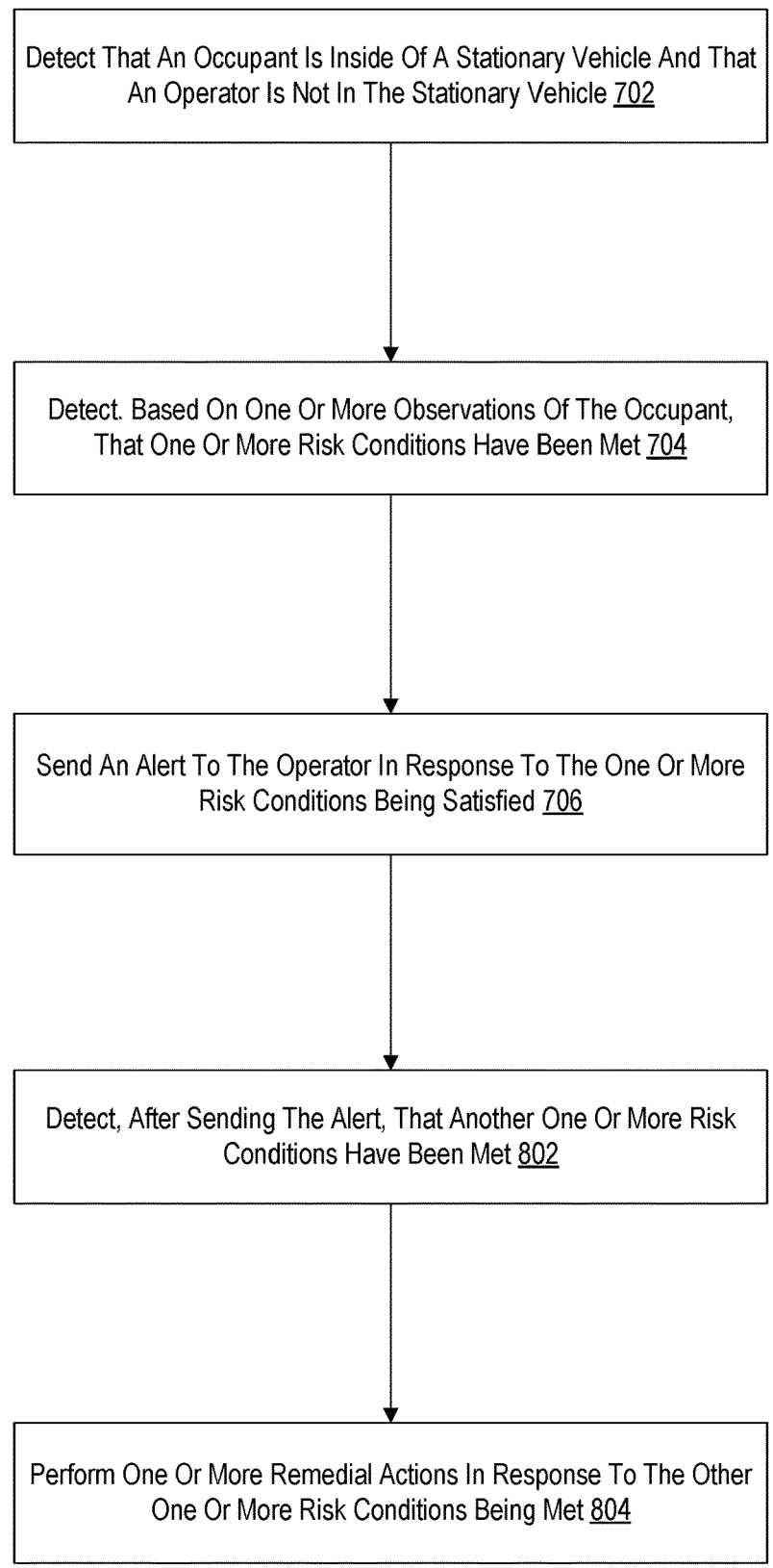
FIG. 8 is a flowchart of another example method for automated occupant protection in stationary vehicles according to some embodiments of the present disclosure.

For further explanation, FIG. 8 sets forth a flowchart of an example method for automated occupant protection in stationary vehicles according to some embodiments of the present disclosure. The method of FIG. 8 is similar to FIG. 7 in that the method of FIG. 8 includes detecting 702 that an occupant is inside of a stationary vehicle and that an operator is not in the stationary vehicle; detecting 704 that one or more risk conditions have been met; and sending 706 an alert to the operator in response to the one or more risk conditions being satisfied.

The method of FIG. 8 differs from FIG. 7 in that the method of FIG. 8 incudes detecting 802, after sending the alert, that another one or more risk conditions have been satisfied. In some embodiments, the other one or more risk conditions have been satisfied may be similar to the previously detected 704 one or more risk conditions. For example, the other one or more risk conditions may be based on observations of the occupant as described above or independent of observations of the occupant. For example, the one or more risk conditions may include time thresholds or time durations. Such time thresholds or durations may be relative to sending 706 the alert (e.g., some amount of time has passed since sending 706 the alert) or to another point in time (e.g., a time at which the vehicle became stationary, a time at which it was determined that the operator is not in the vehicle, and the like). As another example, the other one or more risk conditions may include one or more temperature thresholds. Such temperature thresholds may be similar to or different to other temperature thresholds used in detecting 704 that one or more risk conditions have been met.

Detecting 802 that the other one or more risk conditions have been met may be performed in response to determining that the occupant is still inside the stationary vehicle, in response to determining that the operator is still not inside the stationary vehicle or both. In other words, after having sent 706 an alert to the operator, an occupant is still in the stationary vehicle and at risk of some harm due to the other risk conditions being satisfied.

The method of FIG. 8 also includes performing 804 one or more remedial actions in response to the other one or more risk conditions being met. In some embodiments, the one or more remedial actions includes sending another alert. The other alert may be directed to, as described above, the operator, one or more other recipients, or combinations thereof.

In some embodiments, the one or more remedial actions includes activating one or more systems of the vehicle. The one or more systems of the vehicle may include a window system. For example, in response to the one or more other risk conditions being met, the windows of the vehicle may be automatically at least partially lowered in order to increase air flow and reduce the internal temperature of the vehicle. The one or more systems of the vehicle may include an air conditioning system. For example, in response to the other one or more risk conditions being met, the air conditioning system may be engaged in order to cool the internal air of the vehicle and improve air flow. In some embodiments, the one or more systems of the vehicle may include a sound-producing system, such as a horn, alarm, stereo, and the like. Accordingly, in some embodiments, in response to the one or more risk conditions being met, the vehicle may engage an alarm, horn, and the like to draw attention to the vehicle. The one or more systems may also include interior or exterior lights, or other systems.

In some embodiments, the one or more remedial actions may include escalating remedial actions. For example, if remedial actions for a risk condition include sending an alert, honking horns, and activating a climate control system, a vehicle may perform one or more of these actions upon different triggers (e.g., time, increased risk factor). The vehicle may first send an alert then, if a driver has not responded within a given amount of time, honk the vehicle's horn and activate the climate control system at the same time.

As described herein, the remedial actions are performed at some point after sending the initial alert and determining that an occupant is still at risk. This process may be repeated, using different or similar remedial actions. Thus, as time continues to pass, additional and potentially more extreme remedial actions may be used to ensure safety of the occupant.

Consider an example where an infant is detected in the interior of the stationary vehicle and that no operator is inside of the vehicle. It is then determined that some amount of time has passed since the operator exited the vehicle (e.g., a time duration risk condition) and that the internal temperature of the vehicle has increased beyond some threshold (e.g., a temperature risk condition). In response, an alert is sent to the operator. The operator may then return to the vehicle to remove the infant.

Consider another example where the operator ignores or does not receive the alert (e.g., due to not having their mobile device on their person). After another amount of time has passed, it is determined that the infant is still inside the vehicle and that the internal temperature is still above some threshold. In response, the vehicle may trigger the air conditioning system, send an alert or automatic call to emergency services, or perform other remedial actions to ensure the safety of the occupant.

In an embodiment, a remedial action may include an increased remedial response. For example, if a vehicle's risk condition includes reaching an unsafe temperature, the vehicle may engage climate controls hotter than or colder than comfortable levels, so that the vehicle may reach safer temperatures sooner. As one example, if an occupant is most comfortable at around 22 degrees Celsius, but a cabin area of the vehicle is around 28 degrees Celsius, the vehicle may engage the climate controls to lower than the comfortable temperature (e.g., lower than 22 degrees Celsius). When the cabin area is around 22 degrees Celsius, the vehicle may update the climate control request to 22 degrees Celsius.

In an embodiment, an alert is optional and the vehicle may perform remedial actions in response to a risk condition, without sending an alert. For example, if temperature inside a vehicle has exceeded a safety threshold and may cause imminent harm to an occupant, the vehicle may engage climate controls directly.

As the preceding discussion describes the use of a computing system of a vehicle as performing these methods, in some embodiments, a computing system of a vehicle may operate in a low-power or temporarily powered mode after parking and deactivating motor systems (e.g., stopping the ignition, removing keys, and the like). In some embodiments, where it is determined that no occupant is inside the vehicle, the computing systems may then sleep or shut down in order to conserve power.

In view of the explanations set forth above, the benefits of automated occupant protection in stationary vehicles according to embodiments as discussed above may include:

Improved occupant protection by detecting occupants in stationary vehicles and associated risk conditions.

Improved occupant protection by automatically engaging remedial actions to protect occupants.

Exemplary embodiments of the present disclosure are described largely in the context of a fully functional computer system for automated occupant protection in stationary vehicles. That the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others. Any computer system having suitable programming means will be capable of executing the steps of the method of the disclosure as embodied in a computer program product. Although some of the exemplary embodiments described in this specification are oriented to software installed and executing on computer hardware, nevertheless, alternative embodiments implemented as firmware or as hardware are well within the scope of the present disclosure.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood that any of the functionality or approaches set forth herein may be facilitated at least in part by artificial intelligence applications, including machine learning applications, big data analytics applications, deep learning, and other techniques. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method of automated occupant protection in stationary vehicles, comprising:
   detecting that an occupant is inside a stationary vehicle and that an operator is not in the stationary vehicle based on a plurality of frames of video data captured by one or more cameras of the stationary vehicle;
   detecting, based on one or more behavioral observations of the occupant in another plurality of frames of video data captured by the one or more cameras of the stationary vehicle, that one or more risk conditions have been met, wherein the one or more risk conditions comprise a rate of change for the one or more behavioral observations exceeding a threshold, wherein the one or more behavioral observations comprise at least one of a body posture or a gesture of the occupant; and
   sending an alert to the operator in response to the one or more risk conditions being satisfied.

2. The method of claim 1, wherein determining that the one or more risk conditions have been met is further based on one or more physiological observations of the occupant.

3. The method of claim 1, wherein determining that the one or more risk conditions have been met is further based on criteria independent of observations of the occupant.

4. The method of claim 1, further comprising:
   detecting that another one or more risk conditions have been met after sending the alert; and
   performing one or more remedial actions in response to the other one or more risk conditions being met.

5. The method of claim 4, wherein the one or more remedial actions comprise sending another alert.

6. The method of claim 5, wherein the alert is sent to a recipient other than the operator.

7. The method of claim 4, wherein the one or more remedial actions comprise activating one or more systems of the vehicle.

8. A method of automated occupant protection in stationary vehicles, comprising:
   detecting that an occupant is inside a stationary vehicle and that an operator is not in the stationary vehicle based on a plurality of frames of video data captured by one or more cameras of the stationary vehicle;
   detecting, based on one or more physiological observations of the occupant in another plurality of frames of video data captured by the one or more cameras of the stationary vehicle, that one or more risk conditions have been met, wherein the one or more risk conditions comprise a rate of change for the one or more physiological observations exceeding a threshold; and
   sending an alert to the operator in response to the one or more risk conditions being satisfied.

9. The method of claim 8, wherein determining that the one or more risk conditions have been met is further based on one or more behavioral observations of the occupant, wherein the one or more behavioral observations comprise at least one of a body posture or a gesture of the occupant.

10. The method of claim 8, wherein determining that the one or more risk conditions have been met is further based on criteria independent of observations of the occupant.

11. The method of claim 8, further comprising:
    detecting that another one or more risk conditions have been met after sending the alert; and
    performing one or more remedial actions in response to the other one or more risk conditions being met.

12. The method of claim 11, wherein the one or more remedial actions comprise sending another alert.

13. The method of claim 12, wherein the alert is sent to a recipient other than the operator.

14. The method of claim 13, wherein the one or more remedial actions comprise activating one or more systems of the vehicle.

15. An apparatus for automated occupant protection in stationary vehicles, the apparatus configured to perform steps comprising:
    detecting that an occupant is inside a stationary vehicle and that an operator is not in the stationary vehicle based on a plurality of frames of video data captured by one or more cameras of the stationary vehicle;
    detecting, based on one or more physiological observations of the occupant in another plurality of frames of video data captured by the one or more cameras of the stationary vehicle, that one or more risk conditions have been met, wherein the one or more risk conditions comprise a rate of change for the one or more physiological observations exceeding a threshold; and
    sending an alert to the operator in response to the one or more risk conditions being satisfied.

16. The apparatus of claim 15, wherein determining that the one or more risk conditions have been met is further based on one or more behavioral observations of the occupant, wherein the one or more behavioral observations comprise at least one of a body posture or a gesture of the occupant.

17. The apparatus of claim 15, wherein determining that the one or more risk conditions have been met is further based on criteria independent of observations of the occupant.

18. The apparatus of claim 17, further comprising:
    detecting that another one or more risk conditions have been met after sending the alert; and
    performing one or more remedial actions in response to the other one or more risk conditions being met.

* * * * *